US012168923B2

(12) United States Patent
Haworth

(10) Patent No.: US 12,168,923 B2
(45) Date of Patent: Dec. 17, 2024

(54) SYSTEMS, METHODS, AND DEVICES FOR CONTROLLING THE OPERATION OF AN INDUSTRIAL MACHINE BASED ON A PIPE ATTRIBUTE

(71) Applicant: Joy Global Surface Mining Inc, Milwaukee, WI (US)

(72) Inventor: Samuel Haworth, Oak Creek, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 0 days.

(21) Appl. No.: 18/394,862

(22) Filed: Dec. 22, 2023

(65) Prior Publication Data

US 2024/0125224 A1 Apr. 18, 2024

Related U.S. Application Data

(63) Continuation of application No. 17/198,009, filed on Mar. 10, 2021, now Pat. No. 11,852,004.

(60) Provisional application No. 62/987,485, filed on Mar. 10, 2020.

(51) Int. Cl.
*E21B 44/00* (2006.01)
*E21B 47/007* (2012.01)
*E21B 47/08* (2012.01)
*G08B 21/18* (2006.01)

(52) U.S. Cl.
CPC ............ *E21B 44/00* (2013.01); *E21B 47/007* (2020.05); *E21B 47/08* (2013.01); *G08B 21/182* (2013.01)

(58) Field of Classification Search
CPC ........ E21B 19/09; E21B 19/143; E21B 44/00; E21B 47/007; E21B 47/08; G08B 21/182
See application file for complete search history.

(56) References Cited

U.S. PATENT DOCUMENTS 3,157,286 A * 11/1964 Gyongyosi ........... E21B 19/146 211/1.53
6,131,659 A 10/2000 Johnson
7,154,411 B2 12/2006 Ciglenec et al.
7,588,083 B2 9/2009 Newman
7,878,254 B2 2/2011 Abdollahi et al.
(Continued)

FOREIGN PATENT DOCUMENTS

SU 1714107 A1 2/1992
WO WO-2019102222 A1 * 5/2019 ............. E21B 19/14

OTHER PUBLICATIONS

International Search Report and Written Opinion for Application No. PCT/US2021/021747 dated Jun. 30, 2021 (11 pages).
(Continued)

*Primary Examiner* — Tara Schimpf
*Assistant Examiner* — Yanick A Akaragwe
(74) *Attorney, Agent, or Firm* — Husch Blackwell LLP

(57) ABSTRACT

Systems, methods, and devices are provided for controlling the operation of an industrial machine (e.g., a drill) based on a determined attribute of a pipe. A sensor is configured to generate an output signal related to a characteristic of the pipe. The characteristic of the pipe can be the presence or absence of a pipe, a weight of the pipe, etc. A controller receives the output signal from the sensor and determines an attribute of the pipe based on the output signal from the sensor. The controller is then configured to control the industrial machine or take a control action based on the attribute of the pipe.

20 Claims, 7 Drawing Sheets

(56) References Cited

U.S. PATENT DOCUMENTS

| | | | |
|---|---|---|---|
| 8,428,879 | B2 | 4/2013 | Ekseth et al. |
| 8,640,791 | B2 | 2/2014 | Turner et al. |
| 9,429,009 | B2 | 8/2016 | Paulk et al. |
| 9,784,099 | B2 | 10/2017 | Kale et al. |
| 9,869,172 | B2 | 1/2018 | Donderici et al. |
| 10,330,587 | B2 | 6/2019 | Kumar et al. |
| 10,570,677 | B2 | 2/2020 | Richardson et al. |
| 10,626,683 | B2 * | 4/2020 | Hebebrand ............. E21B 3/022 |
| 2004/0094305 | A1 | 5/2004 | Skjrseth et al. |
| 2012/0330552 | A1 | 12/2012 | Conquergood et al. |
| 2013/0032358 | A1 | 2/2013 | Newman |
| 2015/0232272 | A1 | 8/2015 | Magnuson |
| 2016/0076317 | A1 | 3/2016 | Larkin |
| 2016/0319610 | A1 | 11/2016 | Magnuson |
| 2018/0216423 | A1 | 8/2018 | Henriksen et al. |
| 2019/0100988 | A1 | 4/2019 | Ellis et al. |
| 2019/0128114 | A1 | 5/2019 | Bryant et al. |
| 2020/0040674 | A1 | 2/2020 | Mckenzie et al. |

OTHER PUBLICATIONS

Vega et al., "Smart Monitoring and Decision Making for Regulating Annulus Bottom Hole Pressure While Drilling Oil Wells", Brazilian Journal of Chemical Engineering, vol. 33, No. 4, 2016, pp. 969-983.

* cited by examiner

SYSTEMS, METHODS, AND DEVICES FOR CONTROLLING THE OPERATION OF AN INDUSTRIAL MACHINE BASED ON A PIPE ATTRIBUTE

CROSS-REFERENCE TO RELATED APPLICATIONS

This application is a continuation of co-pending U.S. patent application Ser. No. 17/198,009, filed Mar. 10, 2021, which claims priority to U.S. Provisional Patent Application No. 62/987,485, filed Mar. 10, 2020. The entire content of these applications are incorporated herein by reference.

FIELD

Embodiments described herein related to an industrial machine, such as a drill.

SUMMARY

Embodiments described herein provide systems, methods, and devices for controlling the operation of an industrial machine (e.g., a drill) based on a determined attribute of a pipe. A sensor is configured to generate an output signal related to a characteristic of the pipe. The characteristic of the pipe can be the presence of the pipe, the absence of the pipe, a weight of the pipe, etc. A controller receives the output signal from the sensor and determines an attribute of the pipe based on the output signal from the sensor. In some embodiments, the attribute of the pipe is a wall thickness of the pipe. The controller determines the wall thickness of the pipe, for example, based on a difference between an initial weight for the pipe and a current or present weight of the pipe. The controller is then configured to control the industrial machine or take a control action based on the attribute of the pipe. For example, the controller can change which pipe the industrial machine is using, can rotate the pipes being used by the industrial machine, etc.

One embodiment provides a system for sensing a condition of a pipe of an industrial drill. The system includes a sensor configured to sense a pipe characteristic associated with the pipe and an electronic controller coupled to the sensor and including a processor and a memory. The electronic controller is configured to receive an output from the sensor indicative of the pipe characteristic, determine a pipe attribute based on the pipe characteristic, the pipe attribute indicative of a condition of the pipe for drilling operation, and send an output signal based on the determined pipe attribute.

Another embodiment provides a system for sensing a condition of a pipe of an industrial drill. The system includes a sensor configured to sense a pipe characteristic associated with the pipe and an electronic controller coupled to the sensor and including a processor and a memory. The electronic controller is configured to receive an output from the sensor indicative of the pipe characteristic, determine a pipe attribute based on the pipe characteristic, the pipe attribute indicative of a condition of the pipe for drilling operation, and send an output signal based on the determined pipe attribute.

A further embodiment provides a method of sensing a condition of a pipe of an industrial drill. The drill is configured to rotationally drive the pipe to perform a drilling operation. The method includes receiving, by an electronic controller, a first output from a first sensor, the first output indicative of a pipe characteristic associated with the pipe and determining, by the electronic controller, a pipe attribute based on the pipe characteristic. The method further includes comparing the pipe attribute to a predetermined threshold and when the pipe attribute exceeds a predetermined threshold, send an output signal based on the determined pipe attribute.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
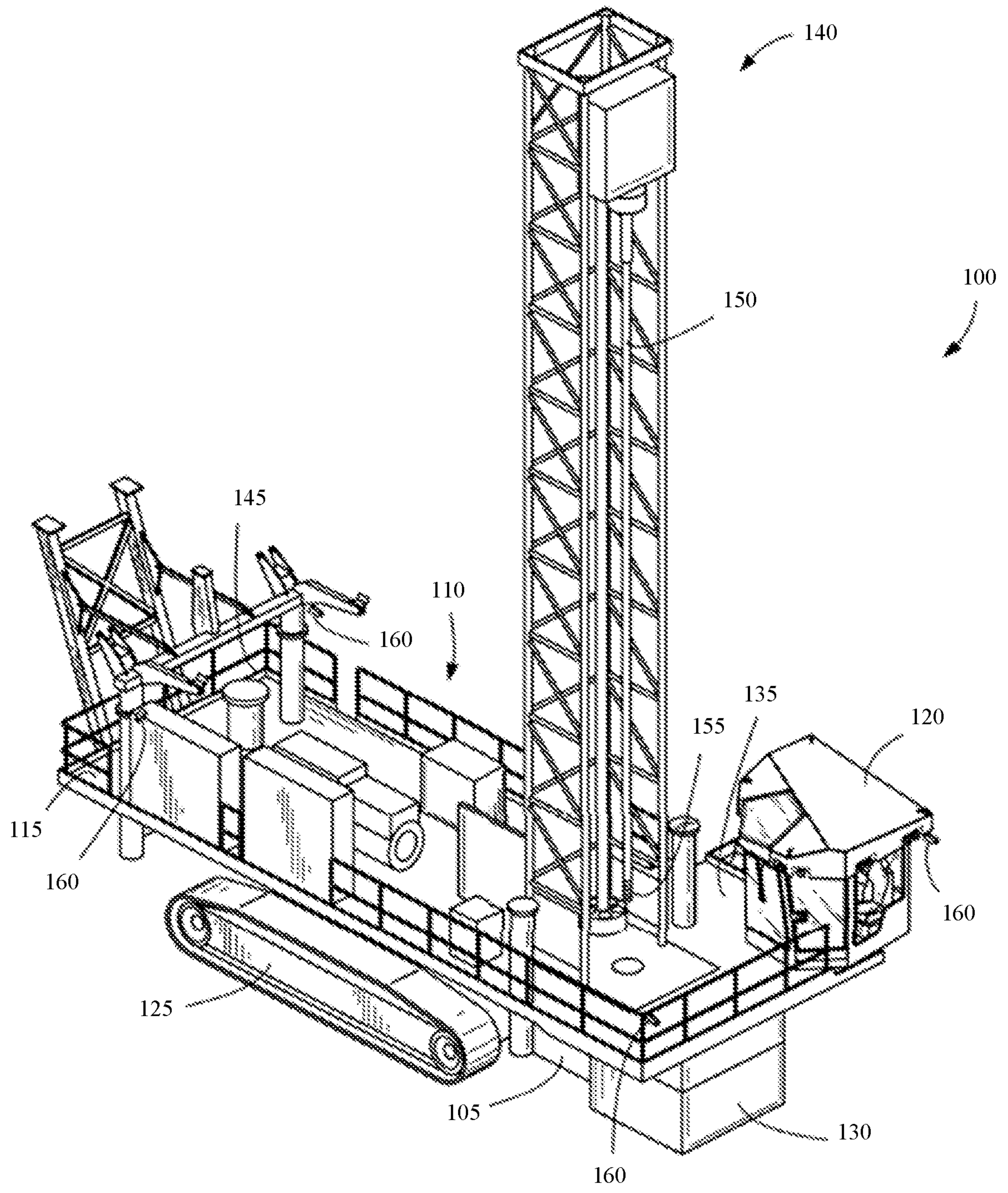
FIG. 1 illustrates an industrial machine, according to embodiments described herein.

Although embodiments described herein can be applied to or used in conjunction with a variety of industrial machines, embodiments described herein are described with respect to a drill, such as a blasthole drill 100 illustrated in FIG. 1. The drill 100 is used, for example, during surface mining operations. The drill 100 includes a base 105, a body 110 including a machinery deck 115, and an operator's compartment or cab module 120 at least partially supported on a portion of the machinery deck 115. In some embodiments, the drill 100 is movable by drive tracks 125 and, when in an operational position, is supported by at least one supporting structure 130. The drill 100 defines a first end 135 where a drill mast 140 is located and a second end 145 opposite to the first end 135. In the illustrated embodiment, the cab module 120 is positioned adjacent to the drill mast 140 near the first end 135 of drill 100.

The drill mast 140 of the drill 100 includes a drill steel or pipe 150 and a drill bit 155 that are used to drill holes in the ground during a surface mining operation. The drill mast 140 also includes a pulldown/hoist mechanism powered by an actuator (e.g., a hydraulic actuator, an electric motor, etc.) that provides turning torque to the pulldown/hoist mechanism through a geared hoist transmission. In some embodiments, the drill mast 140 also includes a pipe storage area for storing drill pipes when the drill pipes are not being used. The pipe storage area is described in greater detail below. During operation, the drill 100 can be positioned in a desired drilling location. Once the drill 100 is securely leveled using leveling controls, the drill pipe 150 of the drill 100 is used to drill holes into the ground. In some embodiments, on-board cameras 160 are positioned on the drill 100. The cameras 160 show the area around the drill 100. In some embodiments, an operator is located remotely from the drill 100 and/or the drill 100 is autonomous. In some embodiments, the autonomous drill 100 is a cab-less autonomous drill 100.

The condition of the pipes for drilling operation may decrease over time, and the pipes may become unsuitable for drilling operation. For example, drill pipes wear over time by erosion of the wall thickness due to the scouring effect of the drill cuttings blowing past out of the borehole. The integrity of the drill pipes may become weaker, thinner, or more susceptible to damage if used during drilling operation or may not preform drilling operations as effectively. Accordingly, provided is a system and method of sensing a condition of a pipe and determining whether the pipe is in condition (i.e., whether it is suitable) for drilling operation.

Figure 2:
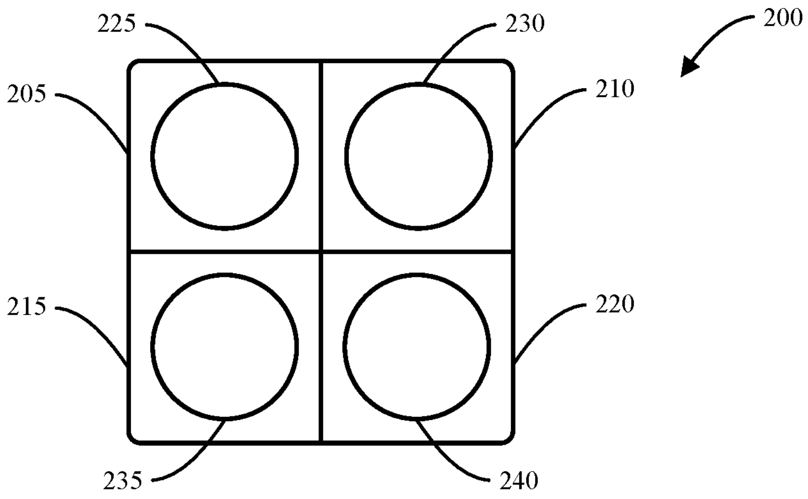
FIG. 2 illustrates a pipe storage unit, according to embodiments described herein.
Figure 3:
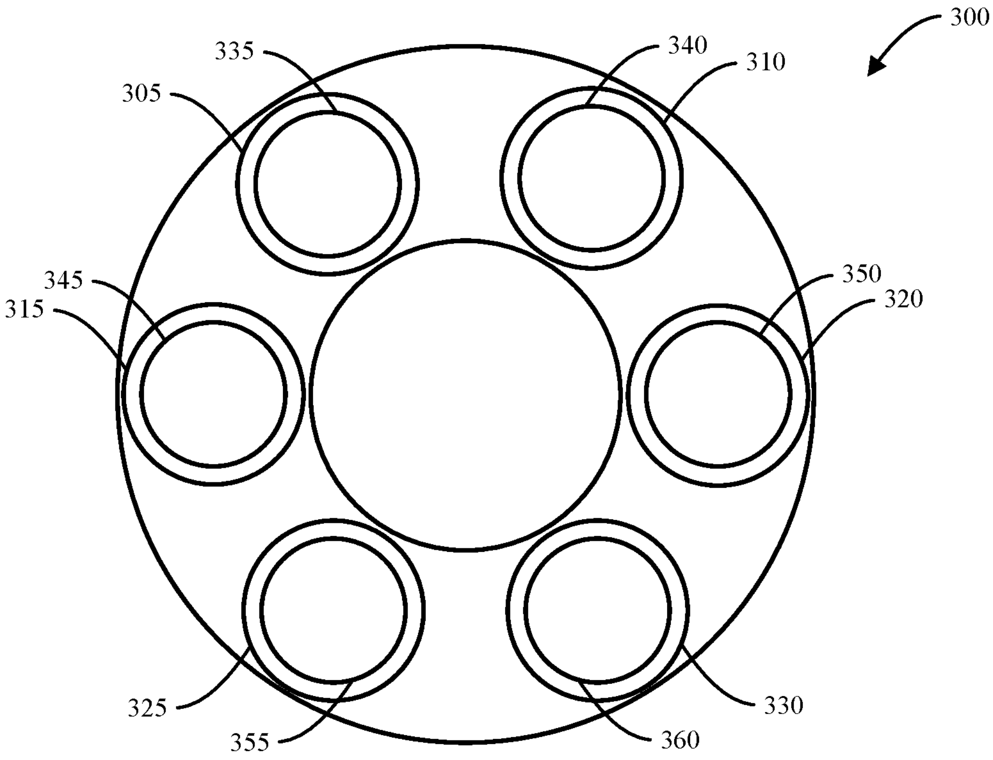
FIG. 3 illustrates a pipe storage unit, according to embodiments described herein.

FIG. 2 illustrates a pipe storage area 200 for storing pipes 150 for use with the drill 100 that can be included in the drill mast 140. The illustrated pipe storage area 200 includes a first pipe storage compartment 205, a second pipe storage compartment 210, a third pipe storage compartment 215, and a fourth pipe storage compartment 220. The pipe storage compartments 205-220 can include a first pipe 225 (e.g., pipe 150), a second pipe 230, a third pipe 235, and a fourth pipe 240, respectively stored in the pipe storage compartments 205-220. The four-compartment pipe storage area 200 is shown in FIG. 2 for illustrative purposes. In other embodiments, additional or fewer pipe storage compartments can be included in the pipe storage area. For example, FIG. 3 illustrates a pipe storage area 300 for the drill 100 that can be included in the drill mast 140. The illustrated pipe storage area 300 includes a first pipe storage compartment 305, a second pipe storage compartment 310, a third pipe storage compartment 315, a fourth pipe storage compartment 320, a fifth pipe storage compartment 325, and a sixth pipe storage compartment 330. The pipe storage compartments 305-330 respectively include a first pipe 335, a second pipe 340, a third pipe 345, a fourth pipe 350, a fifth pipe 355, and a sixth pipe 360.

In some embodiments, the pipe storage area 200 may be a rotating platform with multiple positions for receiving and storing pipes 150. For example, the pipe storage area 200 may be movable to align a pipe storage compartment (e.g., 205-220) and an associated pipe 150 in line bore hole for drilling operation. Similarly, the pipe storage area 200 may be movable to align a pipe 150 with a pipe driver to couple and/or decouple the pipe 150 to the pipe driver. Furthermore, the pipe storage area 200 may be movable to assist in the exchange of pipes (e.g., swapping one pipe for another pipe). For example, the pipe storage area 200 may be movable to align an empty storage compartment 205-220 with a first pipe that is being removed from drilling operation and is being moved into the storage compartment 205-220 for storage. The pipe storage area 200 may then move again to align a different storage compartment 205-200 housing a second pipe, which is intended to replace the first pipe for drilling operation. In other words, the pipe storage area 200 may move or rotate in order to make various storage compartments 205-220 or different pipes housed within the storage compartments 205-220 accessible to the drill.

Movement of the pipe storage area 200 may be executed by a pipe control drive 510 and a pipe control actuator 550, as described herein. For example, the pipe storage area motor 655 may assist in move or rotating the pipe storage area 200. Additionally, a grip arm gripping motor 640 and a grip arm movement motor 650 may also assist in the movement of the pipe storage area 200 and the movement and exchange of pipes 150 within the pipe storage area 200.

Figure 4:
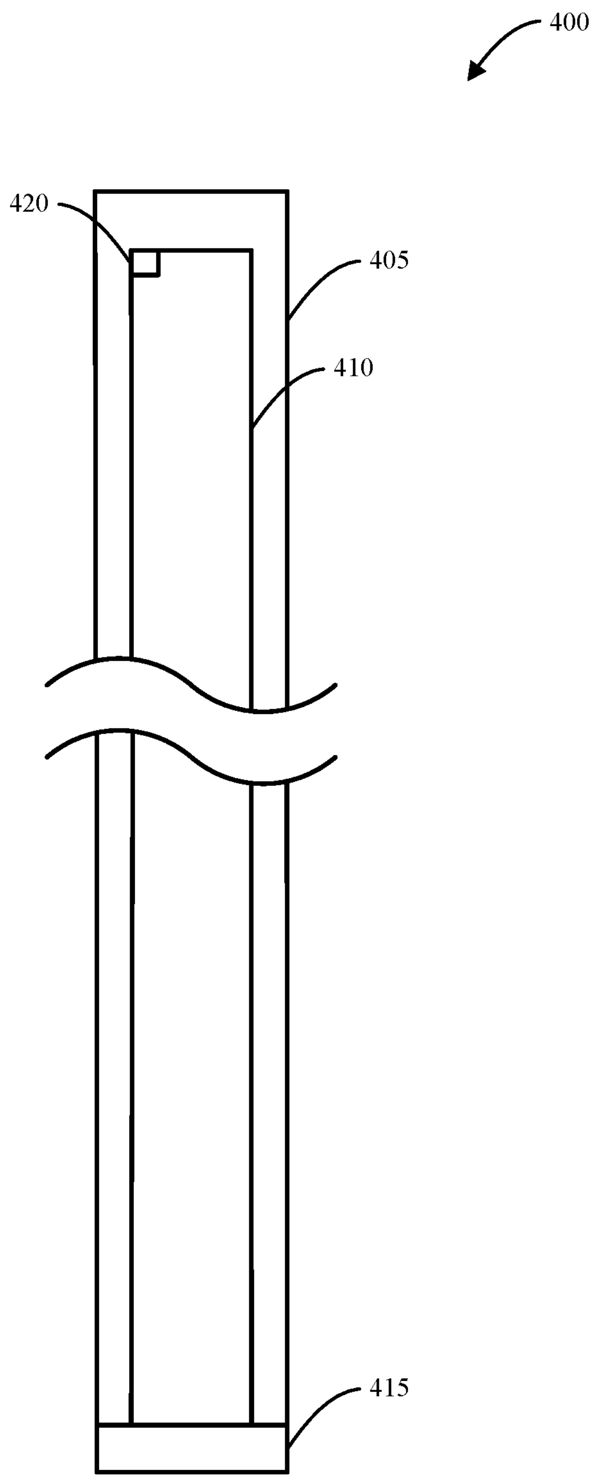
FIG. 4 illustrates a pipe storage unit, according to embodiments described herein.

Each of the pipe storage compartments can be configured to sense or detect one or more pipe characteristics of the pipe(s). The operation of the drill 100 can then be controlled based on the sensed or detected pipe characteristic(s). In some embodiments, the pipe storage compartments may include a pipe sensor to sense or detect pipe characteristic(s). FIG. 4 illustrates a pipe storage area 400 including a pipe storage compartment 405. In some embodiments, the pipe storage compartment 405 corresponds to any of pipe storage compartments 205-220 or 305-330.

The pipe storage compartment 405 includes a pipe 410 stored within the pipe storage compartment 405. The sensor 415 may be positioned in the pipe storage area 200 for sensing or detecting the pipe characteristic when the pipe 410 is stored within any of the pipe storage compartments 205-220 or 305-330. In some embodiments, a sensor 415 is positioned at a lower portion or bottom of the pipe storage compartment 405. In other embodiments, the sensor 415 may be positioned in other sections of the pipe storage compartment 405. Furthermore, in other embodiments, the sensor 415 may be positioned outside of the pipe storage compartment 405. For example, the sensor 415 may be positioned at an independent location outside of the pipe storage compartment 405 where the pipe 410 is transported to acquire a pipe characteristic sensed by the sensor 415. In some embodiments, the sensor 415 may be permanently or temporarily coupled to the pipe 410 to sense the pipe characteristic. Furthermore, in some embodiments, the sensor 415 may be positioned elsewhere on the drill 100 in a location appropriate to sense the pipe characteristics as described herein.

In some embodiments, the sensor 415 is a load cell (e.g., a beam-type load cell). The sensor 415 is configured to, for example, measure a weight (or a mass) of the contents of the pipe storage compartment 405. In other words, the sensor 415 is configured to measure a weight of the pipe 410 when the pipe 410 is stored within the pipe storage compartment 405. For example, the load cell 415 may output a voltage signal (e.g., between 0-5 volts) proportional to the weight resting on the load cell 415, thus measuring the weight of the contents of the pipe storage compartment 405. In some embodiments, a load cell is positioned differently within the pipe storage compartment or outputs different signals to indicate the weight of the contents of the pipe storage compartment 405. In some embodiments, the sensor 415 is positioned such that the sensor 415 may determine the hydraulic pressure of a pipe driverwhen the pipe driver is in a particular state. The state may include operating condition of the industrial machine, or a condition of the pipes. For example, the state may be a particular machine operating condition such as a particular number of pipes in the system, whether the machine is drilling or threading-on new pipes or bits, whether the position of the machine is changing, etc. In one embodiment, the sensor 415 may determine the hydraulic pressure of the pipe driver during a pipe handling state (e.g., when threading/unthreading pipes, when the mast is vertical, when the machine is leveled on its jacks).

In some embodiments, the sensor 415 is positioned such that the sensor 415 may determine the diameter of the pipe 410. In some embodiments the sensor 415 is an optical sensor (e.g., a LIDAR sensor), a sonar, or a laser. The sensor 415 is configured to, for example, determine a diameter of the pipe 410 at an initial time and then at another time when the pipe 410 is stored within the pipe storage compartment 405. For example, the sensor 415 may output a signal proportional to the diameter of the pipe 410.

In some embodiments, the sensor 415 is positioned in the pipe storage compartment or elsewhere on the drill 100 such that the sensor 415 may determine a vibrational frequency (e.g., resonant frequency) of the pipe 410 when a striker hits the pipe 410. For example, the sensor 415 may be configured to determine the frequency at which the pipe 410 rings after a striker hits the pipe 410. In this embodiment, the pipe 410 may be free hanging from the drill 100 when the striker hits the pipe 410 and the sensor 415 measure the frequency of the pipe 410. The sensor 415 may then output a signal to the controller proportional to the frequency at which the pipe 410 rings, thus measuring the mass of the pipe 410. In some embodiments, the vibration sensor may be an accelerometer. In some embodiments the vibration sensor may be and eddy current or a strain gauge. The vibration sensor may be built into a rotary transmission coupling. In some embodiments, the sensor 415 may be an audio sensor to determine a vibrational frequency of the pipe 410 when a striker hits the pipe 410. The audio sensor may be a non-contact sensor such as a knock sensor in an engine or an appropriately sensitive LIDAR sensor. In this embodiment, when the striker hits the pipe 410, the audio sensor records the fundamental frequency of the decay of the noise. The fundamental frequency will increase with a loss of mass in the pipe 410.

Based on the output signal(s) from the sensor 415, the one or more pipe characteristics can be determined. In some embodiments, the presence or absence of the pipe 410 in the pipe storage compartment 405 is determined. In some embodiments, the sensor 415 is protected from an overload condition by a hard stop support that limits, for example, a deflection of a load cell. In some embodiments, the pipe 410 includes an identification device or identification component 420. The identification device 420 is, for example, a radio-frequency identification ("RFID") tag or similar device that allows one or more characteristics of the pipe to be determined. For example, the identification device 420 can automatically provide information to a controller (see FIG. 5A) related to an initial or starting weight of the pipe 410, a product number for the pipe 410, etc. In other embodiments, information related to the initial or starting weight of the pipe 410 can be entered manually or received remotely over a network.

Figure 5A:
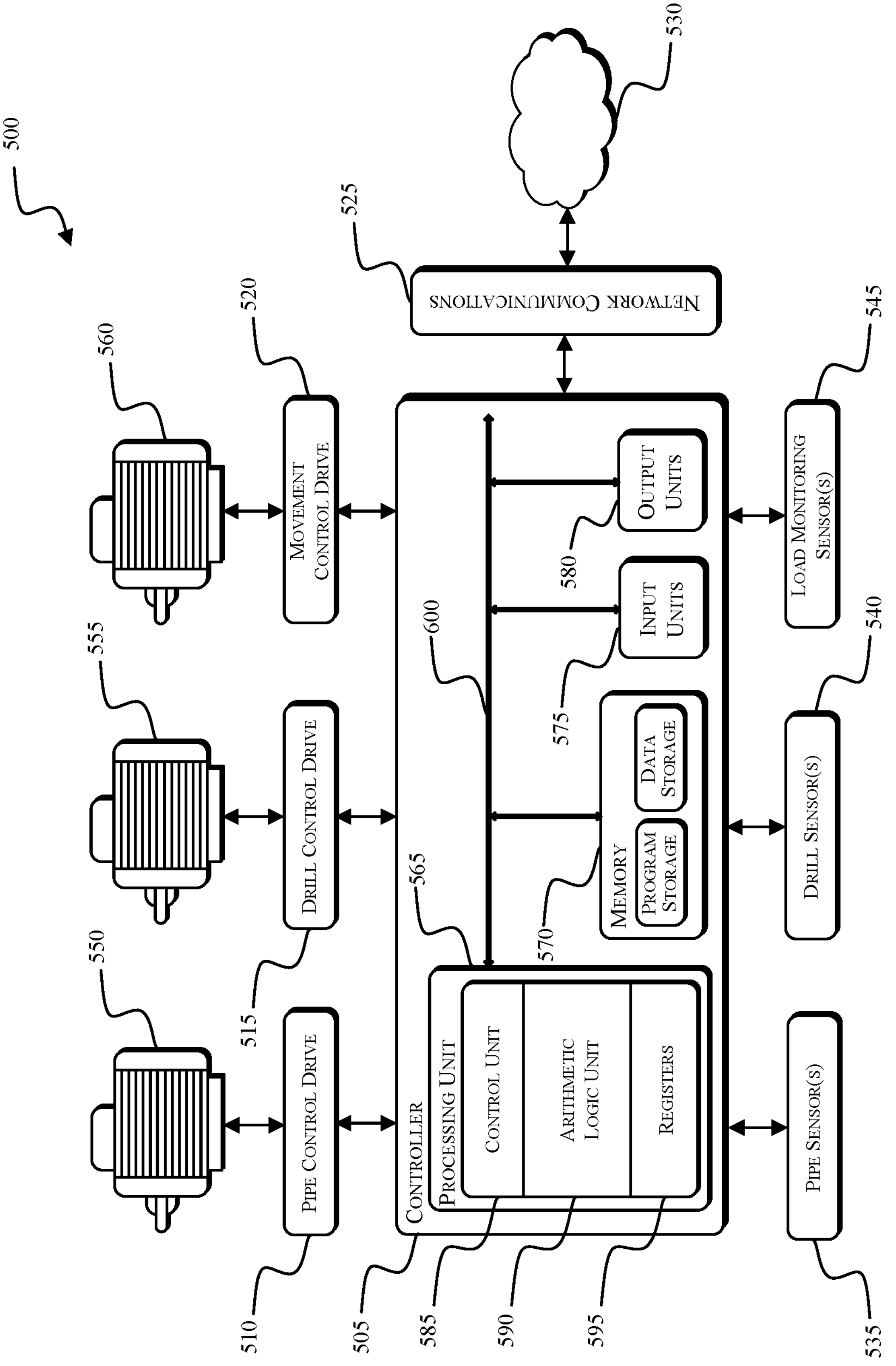
FIG. 5A illustrates a control system for an industrial machine, according to embodiments described herein.

The drill 100 includes a control system 500 including a controller 505, as shown in FIG. 5A. The controller 505 is electrically and/or communicatively connected to a variety of modules or components of the system 500 or drill 100. For example, the illustrated controller 505 is connected to a pipe control drive 510, a drill control drive 515, a movement control drive 520, a network communications module 525 that is connected to a network 530, one or more pipe sensors 535 (e.g., sensor 415), one or more drill sensors 540, and one or more load monitoring sensors 545. The pipe control drive 510 is connected to a pipe control actuator 550 (e.g., a hydraulic motor/pump, electric motor, etc.), the drill control drive 515 is connected to a drill control actuator 555 (e.g., a hydraulic motor/pump, electric motor, etc.), and the movement control drive 520 is connected to a movement control actuator 560 (e.g., a motor, an engine, etc.). The controller 505 includes combinations of hardware and software that are operable to, among other things, control the operation of the system 500, control the operation of the drill 100, etc.

Figure 5B:
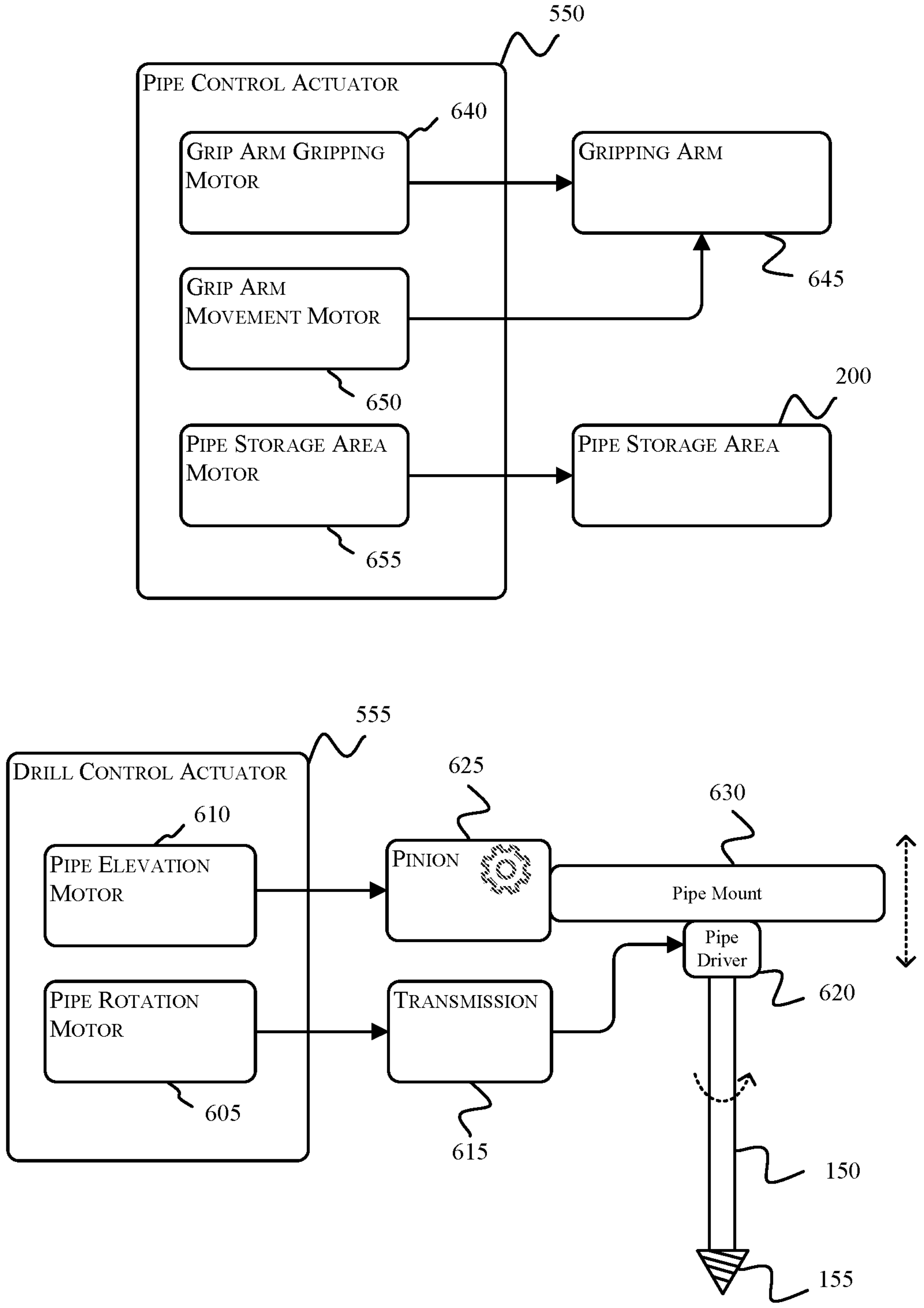
FIG. 5B illustrates a portion of the control system of FIG. 5A according to some embodiments described herein.

FIG. 5B illustrates a portion of the control system of FIG. 5A in further detail, according to some embodiments. In particular, FIG. 5B illustrates an example of the pipe control actuator 550 and of the drill control actuator 555 in further detail, and examples of components connect thereto.

The drill control actuator 555 is configured to control rotation of a connected pipe (and, thereby, a connected drill bit) and to control elevation of pipe (and, thereby, the connected drill bit). In some embodiments, the drill control actuator 555 includes a pipe rotation motor 605 that rotates to thereby cause rotation of the pipe 150, and a pipe elevation motor 610 that controls the pipe 150 to raise and lower. In some embodiments, the pipe rotation motor 605 is coupled to a transmission 615 that receives rotational output of the pipe rotation motor 605 and, in turn, rotationally drives a pipe driver 620 that holds the pipe. Rotating the pipe driver 620 rotationally drives the pipe 150 coupled to the pipe driver 620. In some embodiments, the pipe elevation motor 610 is coupled to drive a pinion 625 that interfaces with a corresponding rack (not shown) provided on and extending along the mast 140. The rack and pinion cooperate to raise and lower a connected pipe mount 630, based on clockwise and counterclockwise rotation of the pinion, to change the elevation of the pipe driver 620 and pipe 150. By rotating the pipe 150 and drill bit 155 and lowering the elevation of the pipe 150 and the drill bit 155, the drill 100 is configured to drill into the ground below the drill 100 (see, e.g., FIG. 1). Although the pipe driver 620 is shown as coupled to the pipe 150, the description similarly applies to other pipes of the drill 100 (e.g., the pipes of FIGS. 2 and 3) when one of these other pipes is coupled to the pipe driver 620.

The pipe control actuator 550 is configured to rotate or swap the pipes of the drill 100. In some embodiments, the pipe control actuator 550 may include multiple hydraulic motor/pumps, electric motors, etc.) to swap pipes. For example, the pipe control actuator 550 may include a grip arm gripping motor 640 that causes a gripping arm 645 to grip and disconnect the current pipe of the drill 100 from the pipe driver 620. The pipe control actuator 550 further includes a grip arm movement motor 650 that moves the gripping arm 645 to move the disconnected pipe towards a pipe storage area such as the pipe storage area 200, and a pipe storage area rotation motor 655 that is configured to rotate the pipe storage area 200 to align an open compartment of the pipe storage area 200 with the disconnected pipe being gripped by the gripping arm 645. Then, the grip arm gripping motor 640 is configured to release the disconnected pipe into the open compartment of the pipe storage area 200. The pipe storage area rotation motor 620 may then rotate the pipe storage compartments 205-220 to align a pipe (e.g., one of the pipes 225-240) with the gripping arm 645, and the grip arm gripping motor 640 is used to control the gripping arm 645 to pick the aligned pipe from the pipe storage compartment of the storage area 200. Then, the grip arm movement motor 650 is used to move the gripping arm 645 to move the picked pipe to connect the pipe to the pipe driver 620. Thus, the pipe control actuator 550 is configured to swap a first pipe (e.g., the pipe 150) off of the pipe driver 620 with a second pipe (e.g., one of the pipes 225-240) of the pipe storage area 200.

As described above, the pipe storage area 200 may be movable to various positions to provide access to a storage compartment (such as storage compartments 205-220) or a pipe 150 that is housed within a storage compartment. For example, the pipe storage area 200 may be movable to align a pipe 150 with a pipe driver to couple the pipe 150 to the pipe driver. Similarly, the pipe storage area 200 may be movable to align a storage compartment with a pipe 150 on the driver to remove the pipe 150 and position it in the pipe storage area. Accordingly, the pipe storage area 200 may be movable to assist in the exchange of pipes (e.g., swapping one pipe for another pipe). In some embodiments, the pipe storage motor 655 moves the pipe storage area 200 to be in line with the pipe driver 620 and a bore hole that requires a pipe. In some embodiments, the grip arm gripping motor 640 and the grip arm movement motor 650 may be used to move the gripping arm 645 to swap a first pipe (e.g., the pipe 150) off of the pipe driver 620 with a second pipe (e.g., one of the pipes 225-240) of the pipe storage area 200. Once the pipes have been switch, the pipe storage motor 655 may move the pipe storage area 200 out of the way for drilling operation.

Although the pipe storage area 200 is shown in and described with respect to the pipe control actuator 550 in FIG. 5B, in some embodiments, the pipe storage area 300 (and its pipes 335-360) or another pipe storage area is used in its place. The motors 605, 610, 640, 650, and 655 of FIG. 5B may be a hydraulic pump/motor, an electric motor, or the like.

Returning to FIG. 5A, the movement control actuator 560 is configured to drive the drive tracks 125 (see FIG. 1) to move the drill 100 over land. The movement control actuator 560 may include a first motor or pump that drives a first (left) track of the drive tracks 125, and a second motor or pump that drives a second (right) track of the drive tracks 125, to provide independent control of each of the first and second drive tracks. With independent control of the first and second drive tracks, the controller 505 can control, via the movement control drive 520, the drill 100 to move forward, to move in reverse, and to turn.

The controller 505 includes a plurality of electrical and electronic components that provide power, operational control, and protection to the components and modules within the controller 505, system 500, and/or drill 100. For example, the controller 505 includes, among other things, a processing unit 565 (e.g., a microprocessor, a microcontroller, or another suitable programmable device), a memory 570, input units 575, and output units 580. The processing unit 565 includes, among other things, a control unit 585, an arithmetic logic unit ("ALU") 590, and a plurality of registers 595 (shown as a group of registers in FIG. 5A), and is implemented using a known computer architecture (e.g., a modified Harvard architecture, a von Neumann architecture, etc.). The processing unit 565, the memory 570, the input units 575, and the output units 580, as well as the various modules or circuits connected to the controller 505 are connected by one or more control and/or data buses (e.g., common bus 600). The control and/or data buses are shown generally in FIG. 5A for illustrative purposes. The use of one or more control and/or data buses for the interconnection between and communication among the various modules, circuits, and components of the system 500 would be known to a person skilled in the art in view of the invention described herein.

The memory 570 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 565 is connected to the memory 570 and executes software instructions that are capable of being stored in a RAM of the memory 570 (e.g., during execution), a ROM of the memory 570 (e.g., on a generally permanent basis), or another non-transitory computer readable medium such as another memory or a disc. Software included in the implementation of the system 500 and controller 505 can be stored in the memory 570 of the controller 505. The software includes, for example, firmware, one or more applications, program data, filters, rules, one or more program modules, and other executable instructions. The controller 505 is configured to retrieve from the memory 570 and execute, among other things, instructions related to the control processes and methods described herein. In other embodiments, the controller 505 includes additional, fewer, or different components.

In some embodiments, the controller 505 is configured to receive input signals through the network communications module 525 over the network 530. The input signals the controller 505 receives include motion command signals from, for example, a remote control interface. The motion command signals include, for example, signals related to adding or changing pipes in a drill string, controlling the motion of the drill bit 155, controlling the movement of the drill 100, etc. Upon receiving a motion command signal, the controller 505 controls the pipe control actuator 550, the drill control actuator 555, and the movement control actuator 560, accordingly.

The network 530 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 530 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio network, a Digital Enhanced Cordless Telecommunications ("DECT") network, a Digital AMPS ("IS-136/TDMA") network, or an Integrated Digital Enhanced Network ("iDEN") network, etc.

The one or more pipe sensors 535 (e.g., sensor 415) generate and provide output signals to the controller 505. Based on the output signals received from the pipe sensors 535, the controller 505 is configured to, among other things, determine the presence or absence of a pipe in a pipe storage compartment, determine a characteristic (e.g., weight, mass, diameter, vibrational frequency) of a pipe either in a pipe storage compartment or out of the pipe storage compartment and determine an attribute of the pipe (e.g., pipe wall thickness, erosion level of the pipe, health of the pipe, integrity of the pipe, wear-level, etc.) based on the characteristic. For example, the weight and the diameter of a new and unused pipe for the drill 100 is known but can vary based on the size of the pipe. Based on the known starting or initial weight of a pipe installed for use with the drill 100 (e.g., within a pipe storage compartment), a measured weight of the pipe can be used by the controller 505 to determine an amount of pipe erosion that has occurred (i.e., based on a difference between initial weight and a current weight or a difference between initial diameter and a current diameter. Once the pipe attribute exceeds a predetermined threshold, the controller 505 may determine whether the pipe is in condition (i.e., whether the pipe is suitable) for drilling operations. For example, once the pipe erosion exceeds a predetermined threshold, the controller 505 may control the industrial machine 100 to switch the eroded pipe with a replacement pipe. In addition, or alternatively, the controller 505 mayinform an operator of the industrial machine of the level of erosion of the pipe or that the pipe erosion has exceeded a threshold so that the operator may take appropriate action.

For example, the pipes used with the drill 100 are made of known materials and can have predictable wear patterns based on specifications provided by a manufacturer (e.g., a linear relationship between pipe weight and pipe wall thickness and between pipe diameter and pipe wall thickness). As a result, as the pipe wears down or is eroded from use (e.g., from the scouring effect of drill cuttings blowing out of the borehole), the controller 505 is configured to correlate a reduction in the weight of the pipe or the diameter of the pipe to a reduction in pipe wall thickness (i.e., loss of pipe material). The pipe wall thickness can then be used to determine when the pipe should be replaced and/or retired. The controller 505 can store the weight measurements and the diameter measurements for the pipes and the determined pipe wall thicknesses in the memory 570. Once the weight of the pipe or the thickness of the pipe walls is below a predetermined threshold, the controller 505 may initiate a command to replace the pipe.

The one or more drill sensors 540 include accelerometers, proximity sensors, etc., that are used by the controller 505 to determine a position or orientation associated with the drill 100. For example, the drill sensors 540 can be used to determine an orientation of the drill mast 140 with respect to gravity (e.g., to determine a verticality of the drill mast 140). An output of the pipe sensors 535 can be modified or compensated based on the angle of the drill mast (e.g., when the drill mast 140 is not vertical, the full weight of a pipe is not sensed by the pipe sensor 535). The compensated outputs form the pipe sensors 535 can then be used to determine the pipe attribute. The controller 505 can store the compensated weight measurements for the pipes and the determined pipe attribute in the memory 570.

The one or more load monitoring sensors 545 include, for example, vibration sensors, torque sensors, rotational speed sensors, etc. The load monitoring sensors 545 can be used by the controller 505 to determine a load experienced by a pipe over time. For example, the controller 505 stores and monitors the torque applied to each pipe, the vibrations experienced by the pipe, the rotational speed of the pipe, the acceleration of the pipe, etc., to determine a load or load force value for each pipe (e.g., in newtons). The monitored load experienced by a pipe can be used in conjunction with or in place of the weight of the pipe to determine a level of wear experienced by the pipe. In some embodiments, the load experienced by a pipe is monitored and compared to a determined wall thickness for the pipe to determine whether the determined wall thickness and the load experienced by the pipe are consistent with one another (i.e., the experienced load produced an expected erosion of the pipe based on historical wear data for the pipe).

Figure 6:
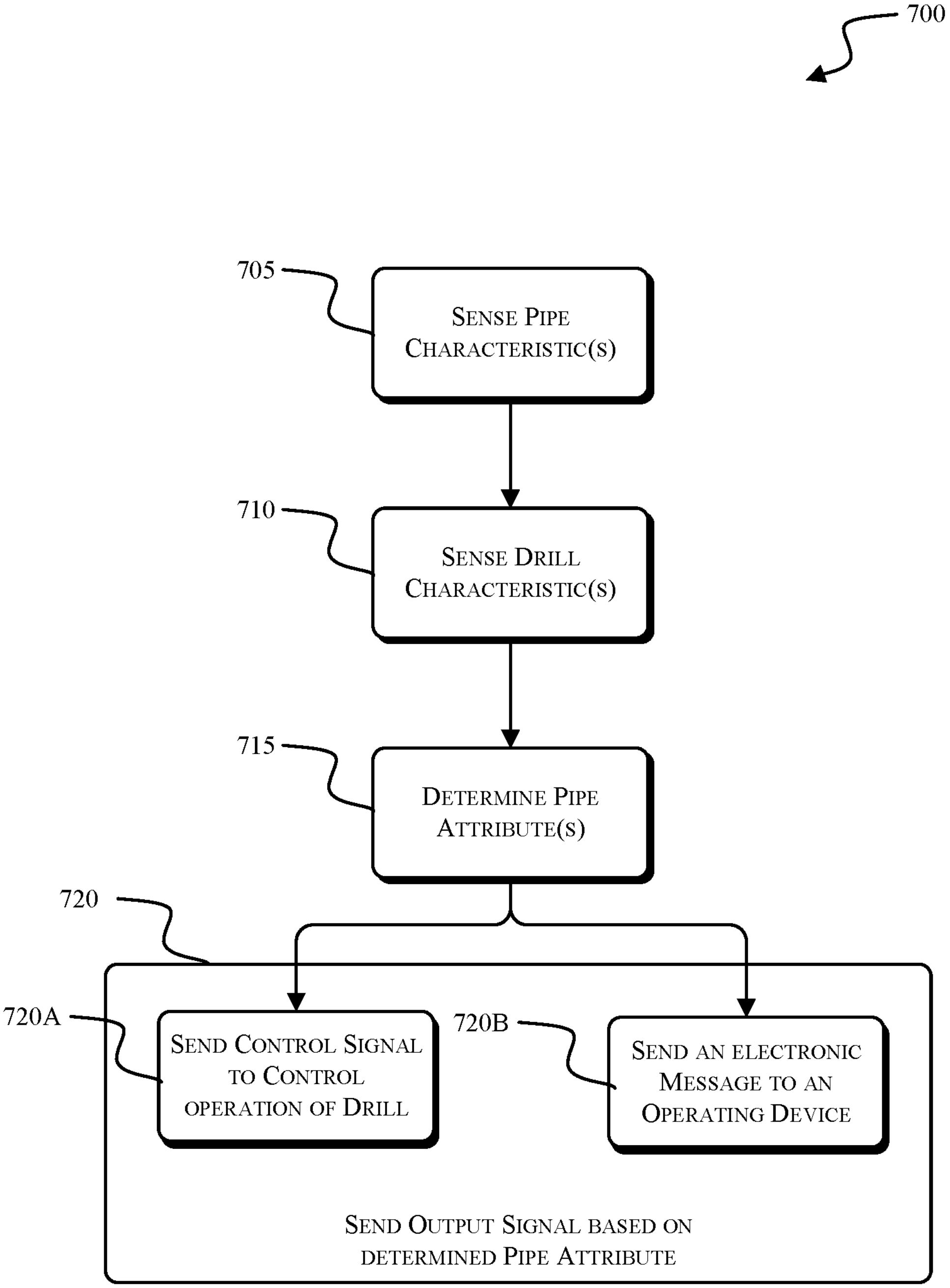
FIG. 6 is a process for controlling an industrial machine, according to embodiments described herein.

FIG. 6 is a process 700 for controlling an industrial machine, such as the drill 100. The process 700 begins with sensing a pipe characteristic (STEP 705). The pipe characteristic is sensed, for example, using the one or more pipe sensors 535 or the one or more load monitoring sensors 545, as described above. Output signals from the one or more pipe sensors 535 or load monitoring sensors 545 related to the pipe characteristic are provided to the controller 505. Following STEP 705, a drill characteristic is sensed (STEP 710). The drill characteristic is sensed using the one or more drill sensors 540 or the one or more load monitoring sensors 545, as described above. Output signals from the one or more drill sensors 540 or load monitoring sensors 545 related to the drill characteristic are provided to the controller 505. For example, the one or more drill sensors 540 indicate to the controller 505 a position or orientation associated with the drill 100, such as an orientation of the drill mast 140 with respect to gravity. The one or more load monitoring sensor 545 may indicate a load applied to the pipe during operation of the drill.

Following STEP 710, the controller 505 determines a pipe attribute (e.g., pipe wall thickness, pipe integrity, or pipe wear level) based on the pipe characteristic and the drill characteristic (STEP 715). For example, to determine the pipe attribute, the pipe characteristic indicated by the one or more pipe sensors 535 may be modified or compensated based on the angle of the drill mast (e.g., when the drill mast 140 is not vertical, the full weight of a pipe or the accurate diameter of the pip is not sensed by the pipe sensor 535). In some embodiments, when the drill mast 140 is vertical, and the pipe sensor 535 includes the load cell (see FIG. 4), the vibration sensor, or the pressure sensor indicating the weight of the pipe, the weight indicated by the load cell, the vibration sensor, or the pressure sensor may be determined to be the weight of the pipe without further compensation (for example, the weight may be multiplied by a compensation factor of 1.0). However, when the drill characteristic indicates that the drill mast 140 is a 15 degree angle off a vertical, the weight of the pipe indicated by the sensor may be adjusted upwards by multiplying the indicated weight by a compensation factor corresponding to the 15 degree angle. In some embodiments, when the drill mast 140 is vertical, and the pipe sensor 353 includes an optical sensor indicating the diameter of the pipe, the diameter indicated by the optical sensor may be determined to be the diameter of the pipe without further compensation (for example, the diameter may need no further calculations). However, when the drill characteristic indicates that the drill mast 140 is a 15 degree angle off the vertical, the diameter of the pipe indicated by the optical sensor may be adjusted by the controller 505 by calculating the diameter with the 15 degree offset taken into account.

The compensated outputs from the pipe sensors 535 can then be used to determine the pipe attribute. For example, the compensated weight value or diameter value may correspond to a pipe thickness, a pipe integrity level, or a pipe wear level. As described above, the weight of the pipe 150 may correspond to the pipe wall thickness and, thus, the wear-level of the pipe. For example, as the pipe wears down or is eroded from use (e.g., from the scouring effect of drill cuttings blowing out of the borehole), the reduction in the weight of the pipe or the diameter of the pipe corresponds to a reduction in pipe wall thickness and indicates an increase amount of wear on the pipe. In one example, to determine the pipe attribute, the controller 505 can determine a difference between the determined compensated weight or diameter to a previously stored initial compensated weight measurement or diameter measurement for the pipe, and the difference corresponds to the pipe attribute. For example, the controller 505 may include a look up table that maps difference levels to a pipe thickness, a pipe health level, a pipe integrity level, or a pipe wear-level, where the larger the difference, the higher the wear-level, the lower the health level, and the less the pipe thickness. In another example, the controller 505 may include a look-up table that maps compensated weights or diameters for a particular pipe or type of pipe to a pipe attribute, where the lower the weight or the diameter, the higher the wear-level, the lower the heath level, and the less the pipe thickness. Accordingly, to determine a pipe attribute in some embodiments, the controller 505 uses the determined compensated weight or diameter as an input to the lookup table and obtains the pipe attribute as an output.

Although listed as separate examples of pipe attributes, the pipe thickness, pipe health level, and pipe wear level attributes may have some overlap in their meanings and scope. For example, pipe thickness may be an example of a pipe wear level or a pipe health level, and a pipe wear level may be an example of a pipe health level.

In some embodiments of the process 700, in STEP 715, the pipe attribute is determined based on the pipe characteristic and without the drill characteristic. For example, STEP 710 may be bypassed, and the pipe characteristic determined in STEP 705 may be used as an input to a lookup table or equation that maps the pipe characteristic to the pipe attribute (e.g., without compensating the pipe characteristic based on a sensed drill characteristic). Accordingly, in some embodiments, the process 700 is executed by sensing a pipe characteristic (STEP 705), determining a pipe attribute (STEP 715), and sending an output signal based on the determined pipe attribute (STEP 720).

After the controller 505 determines the pipe attribute, the controller 505 is configured to send an output signal based on the determined pipe attribute (STEP 720). In some embodiments, the output signal may be a control signal sent by the controller 505 in order to control the drill 100 based on the pipe attribute (STEP 720A). As described in further detail herein, the controller 505 may control the pipe control actuator 550 o the drill control actuator 555 based on the determined pipe attribute. In another embodiment, the output signal may be an electronic message to an operator device to inform an operator of the drill of the pipe attribute and/or whether the pipe is suitable for drilling operation (STEP 720B). Furthermore, in some embodiments, the controller 505 may be configured to both send a control signal to control operation of the drill (STEP 720A) and send an electronic message to an operating device to inform an operator of the drill of the pipe attribute (STEP 720B).

The controller 505 is configured to determine when a pipe is no longer suitable for use with the drill. The controller 505 may determine a pipe is unsuitable for use with the drill when the pipe attribute (e.g., the weight, wall thickness, or load on the pipe) exceeds a predetermined threshold. As will be understood by a person skilled in the art, depending on the pipe attribute, a pipe attribute may "exceed a predetermined threshold" when the attribute is greater than the threshold or may "exceed a predetermined threshold" when the pipe attribute drops below a predetermined threshold. For example, the controller 505 may determine that a pipe is unsuitable for use with the drill when the wall thickness of the pipe (e.g., pipe wall too thin) drops below a predetermined threshold. As another example, the controller 505 may determine that a pipe is unsuitable for use with the drill when a load (e.g., a torque) applied to the pipe is greater or for a longer period of time than a predetermined threshold.

Once the controller 505 determines the pipe attribute and/or whether the pipe is in condition for drilling operation, the controller 505 may send an output signal to either control operation of the drill (STEP 720A) or inform the operator of the pipe attribute and condition of the pipe for drilling (STEP 720B). In some embodiments, the controller 505 is configured send an control signal to to change a pipe being used by the drill 100 based on the pipe attribute (STEP 720A). For example, the controller 505 is configured to rotate the pipes being used by the drill 100 to distribute the wear among all of the pipes in the drill 100. For example, the controller 505 is configured to provide an indication to the drill control actuator 555, pipe control actuator 550, or both, to change the pipes based on the pipe attribute so as to distribute a wear among the plurality of pipes (e.g., among the pipes 225-240). To change the pipes, in some embodiments, the controller 505 is configured to control the drill control actuator 555 to cease rotating a first pipe, such as the pipe 225 of a plurality of pipes 225-240. The controller 505 then controls the pipe control actuator 550 to switch, based on the pipe attribute, from the first pipe 235 to a second pipe, such as the pipe 230. The pipe control actuator 550 may be controlled to switch the pipes as described above with respect to FIG. 5B. The controller 505 then controls the drill control actuator 555 to rotationally drive the second pipe 230.

In addition, or alternatively, the controller 505 may send an electronic message to an operator device to inform the operator of the drill of the pipe attribute (STEP 720B). For example, in some embodiments, the controller is configured to provide an electronic message or other indication through the network communications module 525 or over the network 530 to an operator device. The operator device may be a remote device positioned at a remote location from the drill, or may be included on or near the drill (such as in the cab module 120). The operator device may include a portable user device, such a smart device, tablet, phone, or laptop. The operator device may receive an electronic message from the controller 505 indicating that one or more of the pipes within the drill 100 has reached or will soon reach the end of its useful life. By doing so, additional pipes for the drill 100 can be ordered and/or transported to the drill 100 to avoid a downtime delay from waiting for new pipes to arrive.

Although the steps of the process 700 are illustrated in a sequential manner, one or more of the steps of the process 700 are capable of being performed both prior to or following one or more other steps of the process 700. For example, STEP 710 can be performed prior to or simultaneously with respect to STEP 705. As such, the order of the process 700 shown in FIG. 6 is merely illustrative. In some embodiments, the drill characteristics are not used in the operation of the drill, and the STEP 710 is omitted.

Figure 7:
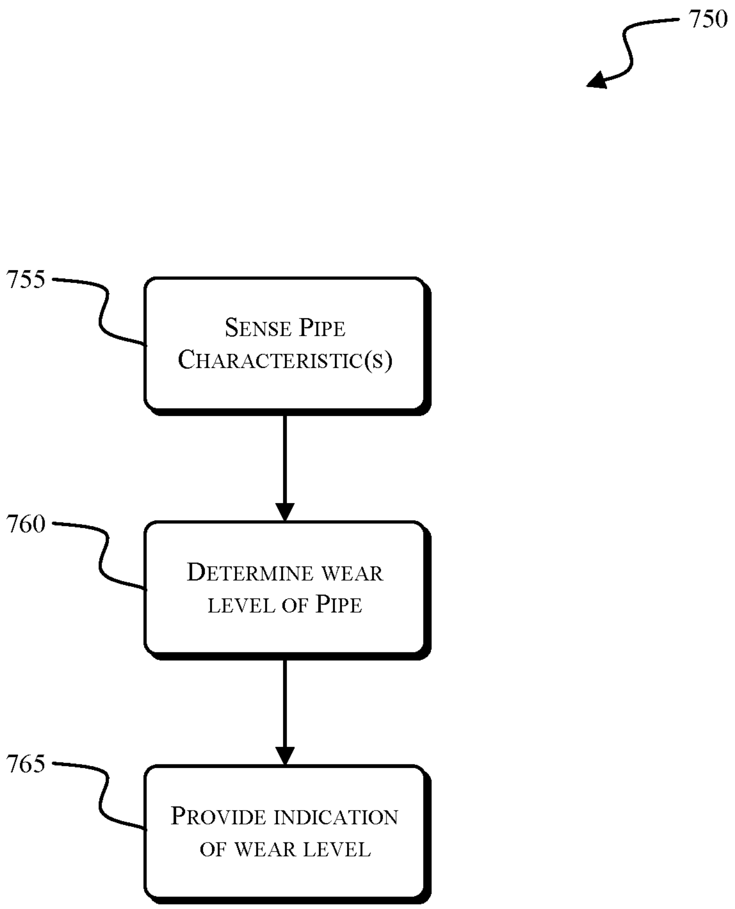
FIG. 7 is a process for determining a wear level of a pipe in an industrial machine, according to embodiments described herein.

FIG. 7 is a process 750 for determining a wear level of a pipe in an industrial machine, such as the drill 100. The process begins with sensing a pipe characteristic (STEP 755). The pipe characteristic is sensed, for example, using the load cell 415, as described above with respect to FIG. 4. Output signals from the load cell 415 related to the pipe characteristic of a pipe 150 in a drill 100 are provided to the controller 505. In some embodiments, the load cell or the vibration sensor indicates a weight of the pipe 150, which is used as the pipe characteristic. In some embodiments, the optical sensor indicates a diameter of the pipe 150, which is used as the pipe characteristic. Following STEP 755, the controller 505 is configured to determine a wear level of the pipe 150 based on the pipe characteristic, such as based on the weight of the pipe 150 determined by the load cell or the vibration sensor and based on the diameter of the pipe 150 determined by the optical sensor (STEP 760). As described above, the weight of the pipe 150 and the diameter of the pipe 150 may correspond to the pipe wall thickness and, thus, the wear-level of the pipe.

For example, as the pipe wears down or is eroded from use (e.g., from the scouring effect of drill cuttings blowing out of the borehole), the reduction in the weight of the pipe or the diameter of the pipe corresponds to a reduction in pipe wall thickness and indicates an increase amount of wear on the pipe. In one example, to determine a wear level, the controller 505 can determine a difference between the weight measured in STEP 755 to a previously stored initial weight measurement for the pipe, and the difference corresponds to a wear-level of the pipe.

In another example, to determine a wear level, the controller 505 can determine a difference between the diameter of the pipe measured in STEP 755 to a previously stored initial diameter measurement for the pipe, and the difference corresponds to a wear-level of the pipe. For example, the controller 505 may include a look up table that maps difference levels to wear-levels, where the larger the difference, the higher the wear-level. In another example, the controller 505 may include a look-up table that maps weights for a particular pipe or type of pipe to a wear-level, where the lower the weight, the higher the wear-level. Accordingly, to determine a wear level in some embodiments, the controller 505 may use the weight of the pipe measured in STEP 755 as an input to the lookup table, and obtains the wear-level as an output. In another example, the controller 505 may include a look-up table that maps diameter of a particular pipe or type of pipe to a wear-level, where the lower the diameter, the higher the wear-level. Accordingly, to determine a wear level in some embodiments, the controller 505 uses the diameter of the pipe measured in STEP 755 as an input to the lookup table, and obtains the wear-level as an output.

After the controller 505 determines the wear level, the controller 505 is configured to provide an indication of the wear level of the pipe 150. For example, the controller 50 may provide an indication when the wear level of the pipe exceeds a predetermined threshold (STEP 765). For example, the controller 505 is configured to provide an electronic message to an operator device to inform an operator of the drill 100 of the determined wear level, which allows the operator to take responsive action. The operator device may be a personal computing device (e.g., laptop, smart phone, tablet, etc.), a user interface device within the cab of the drill 100, or other electronic computing device. The operator device may, in response to the electronic message, provide the wear level graphically (e.g., on a display screen), audibly (e.g., via a speaker), or with a tactile output device (e.g., via a vibration-generating device). The controller 505 may be configured to provide an indication to the pipe control actuator 550, to the drill control actuator 555, or to both, for changing or rotating the pipes, as described above with respect to STEP 720 of FIG. 6. The controller 505 may be configured to provide an indication for storing the determined wear level in the register 595 or the memory 570. The stored wear level may be later retrieved by another device or used by the controller 505 to provide an electronic message to an operator device or to control changing pipes, as described.

In some embodiments, the controller 505 is further configured to determine whether a pipe, such as the pipe 410, is present in the pipe storage compartment 405, based on the pipe characteristic of the pipe 410 sensed using a sensor 415, such as the load cell, the vibration sensor, or the optical sensor. In an example embodiment, the pipe 410 is a first pipe 225 of a plurality of pipes 225-240 that are configured to be rotationally driven by the drill 100. In such instances, the controller 505 may be configured to determine whether a second pipe 230 is present in the second pipe storage compartment 210, based on an output from a second sensor, which is similar to the sensor 415 but associated with the second pipe storage compartment 210. In another example embodiment, a pipe characteristic of the second pipe 230 is sensed by the second sensor, and the controller 505 is configured to determine a wear level of the second pipe 230 based on the pipe characteristic of the second pipe 230. In such instances, the controller 505 may be configured to provide a second indication, which indicates the wear level of the second pipe 230. Accordingly, the sensor 415 for each pipe is configured to provide to the controller 505 both an indication of wear level of the pipe and an indication of presence of the pipe. The controller 505 is further configured to provide an indication of the presence of the pipe (in addition to the wear level), such as by providing the indication to an operator device for being conveyed visually, audibly, or tactilely.

In some embodiments of the process 750, the controller 505 senses a drill characteristic, similar to STEP 710 of the process 700. In these embodiments, the controller 505 may then use the drill characteristic along with the pipe characteristic to determine the wear level of the pipe, similar to as described above with respect to STEP 715 of the process 700.

Although the steps of the process 750 are illustrated in a sequential manner, one or more of the steps of the process 750 are capable of being performed both prior to or following one or more other steps of the process 750. As such, the order of the process 750 shown in FIG. 7 is merely illustrative.

Thus, embodiments described herein provide, among other things, systems, methods, and devices for controlling the operation of an industrial machine such as a drill based on a determined attribute of a pipe.

What is claimed is:

1. An industrial mining drill comprising:

a drill mast;

a rotatable pipe storage including a plurality of compartments for storing a plurality of pipes, each compartment configured to selectively store one of the pipes;

a drive control actuator configured to rotationally drive a first pipe during a drilling operation;

a sensor configured to monitor a weight of a pipe stored in an associated one of the compartments;

an electronic controller coupled to the sensor and including a processor and a memory, the electronic controller configured to:

receive an output from the sensor, determine a presence or absence of one of the pipes within each of the compartments based on an output from the sensor, compare the monitored weight of the pipe stored in the associated one of the compartments to an initial weight, the initial weight representing one of a starting weight and a previously stored weight of the pipe stored in the associated one of the compartments, and send an output signal; and a pipe control drive configured to receive the output signal and selectively rotate the pipe storage to align one of the compartments with the drive control actuator based on at least one of the monitored weight of the pipe, the presence of pipes in the compartments, and the absence of pipes in the compartments, the pipe control drive being configured to transfer the first pipe to one of the compartments, the pipe control drive being configured to remove a second pipe from another compartment and position the second pipe proximate the drive control actuator.

2. The industrial drill of claim 1, wherein the output signal includes an electronic message to an operator device, the electronic message providing information about a condition of the pipe based on the weight.

3. The industrial drill of claim 1, wherein the sensor is a load cell.

4. The industrial drill of claim 3, wherein the load cell is positioned at a lower portion of the compartment and senses a weight resting on the load cell.

5. The industrial drill of claim 1, wherein the electronic controller is configured to determine whether the pipe is unsuitable for use with the industrial drill, wherein the pipe is unsuitable for use when the monitored weight exceeds a predetermined threshold.

6. The industrial drill of claim 1, wherein the electronic controller is further configured to determine a modified weight of the pipe based on an angle of the drill mast.

7. The industrial drill of claim 1, wherein the electronic controller is further configured to determine a pipe attribute based on the weight of the pipe, the pipe attribute including at least one of a pipe wall thickness and a wear level of the pipe.

8. A system for sensing a condition of a pipe of an industrial drill including a drill mast and a drive control actuator configured to rotationally drive a first pipe during a drilling operation, the system comprising:

a rotatable pipe storage including a plurality of compartments for storing a plurality of pipes, each compartment configured to selectively store one of the pipes;

a sensor configured to monitor a weight of a pipe stored in an associated one of the compartments;

an electronic controller coupled to the sensor and including a processor and a memory, the electronic controller configured to:

receive an output from the sensor, determine a presence or absence of one of the pipes within each of the compartments based on an output from the sensor, compare the monitored weight of the pipe stored in the associated one of the compartments to an initial weight, the initial weight representing one of a starting weight and a previously stored weight of the pipe stored in the associated one of the compartments, and send an output signal; and a pipe control drive configured to receive the output signal and selectively rotate the pipe storage to align one of the compartments with the drive control actuator based on at least one of the monitored weight of the pipe, the presence of pipes in the compartments, and the absence of pipes in the compartments, the pipe control drive being configured to transfer the first pipe to one of the compartments, the pipe control drive being configured to remove a second pipe from another compartment and position the second pipe proximate the drive control actuator.

9. The system of claim 8, wherein the output signal further includes an electronic message to an operator device, the electronic message providing information about a condition of the pipe based on the weight.

10. The system of claim 8, wherein the sensor is a load cell.

11. The system of claim 10, wherein the load cell is positioned at a lower portion of the compartment and senses a weight resting on the load cell.

12. The system of claim 8, wherein the electronic controller is configured to determine whether the pipe is unsuitable for use with the industrial drill, wherein the pipe is unsuitable for use when the monitored weight exceeds a predetermined threshold.

13. The system of claim 8, wherein the electronic controller is further configured to determine a modified weight of the pipe based on an angle of the drill mast.

14. The system of claim 8, wherein the electronic controller is further configured to determine a pipe attribute based on the weight of the pipe, the pipe attribute includes at least one of a pipe wall thickness and a wear level of the pipe.

15. A method of sensing a condition of a pipe of an industrial drill having a drill mast, the drill configured to selectively drive one of a plurality of pipes to perform a drilling operation, the method comprising:

monitoring, with a sensor, a weight of each of a plurality of pipes stored in a plurality of compartments of a rotatable pipe storage;

receiving, with an electronic controller, an output from the sensor;

determining, with the electronic controller, a presence or an absence within each of the compartments based on the output from the sensor;

comparing, with the electronic controller, the monitored weight to an initial weight, the initial weight representing one of a starting weight or a previously stored weight associated with the pipe;

actuating a pipe control drive to selectively rotate the pipe storage to align a first one of the compartments with a drive control actuator based on at least one of the monitored weight of the plurality of pipes, the presence of pipes in the compartments, and the absence of pipes in the compartments; and transfer one of the pipes from the first compartment to the drive control actuator.

16. The method of claim 15, further comprising, actuating the pipe control drive to selectively rotate the pipe storage to align the first compartment with the drive control actuator; and transferring the one pipe from the drive control actuator to the first compartment.

17. The method of claim 15, further comprising sending, with the electronic controller, an output signal including an electronic message to an operator device, the electronic message providing information about a condition of the pipe based on the weight.

18. The method of claim 15, further comprising determining, with the electronic controller, whether the pipe is unsuitable for use with the industrial drill, wherein the pipe is unsuitable for use when the monitored weight exceeds a predetermined threshold.

19. The method of claim 15, further comprising determining, with the electronic controller, a modified weight of the pipe based on an angle of the drill mast.

20. The method of claim 15, further comprising determining, with the electronic controller, a pipe attribute based on the weight of the pipe, the pipe attribute including at least one of a pipe wall thickness and a wear level of the pipe.

* * * * *